US007014400B1

(12) United States Patent
LaBelle et al.

(10) Patent No.: US 7,014,400 B1
(45) Date of Patent: Mar. 21, 2006

(54) CARGO AREA RAIL SYSTEM FOR TONNEAU COVER AND/OR ANOTHER ACCESSORY

(75) Inventors: Donald J. LaBelle, Macomb Township, Macomb County, MI (US); Vincent M. McKeoun, North Branch, MI (US)

(73) Assignee: Durakon Acquisition Corp., Lapeer, MI (US)

( * ) Notice: Subject to any disclaimer, the term of this patent is extended or adjusted under 35 U.S.C. 154(b) by 85 days.

(21) Appl. No.: 10/677,855

(22) Filed: Oct. 2, 2003

Related U.S. Application Data

(60) Provisional application No. 60/415,956, filed on Oct. 3, 2002.

(51) Int. Cl.
*B61D 45/00* (2006.01)
(52) U.S. Cl. .................................................. 410/104
(58) Field of Classification Search ............... 296/39.1, 296/39.2, 100.02; 410/104, 106, 110; 108/44, 108/143; D12/221, 223
See application file for complete search history.

(56) References Cited

U.S. PATENT DOCUMENTS

| 4,210,361 | A | * | 7/1980 | Marvin et al. ............... 296/210 |
| 4,832,394 | A | * | 5/1989 | Macomber ............ 296/100.06 |
| 5,971,469 | A | * | 10/1999 | Lund et al. ............ 296/100.01 |
| 5,988,722 | A | * | 11/1999 | Parri ....................... 296/26.09 |
| 6,126,226 | A | * | 10/2000 | Wheatley ................ 296/100.17 |
| 6,152,513 | A | * | 11/2000 | Karrer ......................... 296/37.6 |
| 6,238,153 | B1 | * | 5/2001 | Karrer .......................... 410/102 |
| 6,250,321 | B1 | * | 6/2001 | Ernst ......................... 135/88.11 |
| D446,181 | S | * | 8/2001 | Darbishire ................. D12/223 |
| 6,328,364 | B1 | * | 12/2001 | Darbishire ............... 296/26.09 |
| D477,805 | S | | 7/2003 | LaBelle et al. |
| 6,712,418 | B1 | * | 3/2004 | Lathers ................... 296/100.02 |

OTHER PUBLICATIONS

LaBelle et al., U.S. Provisional Patent Application No. 60/415,956 filed on Oct. 3, 2002 A.D.

* cited by examiner

*Primary Examiner*—H. Gutman
(74) *Attorney, Agent, or Firm*—Christopher John Rudy

(57) ABSTRACT

Rail for a tonneau cover and/or another accessory includes an elongate member having an upwardly facing channel and a sidewardly facing channel. The upwardly facing channel can be defined by an inside wall, a bottom, and an outside wall; and the sidewardly facing channel can be defined by an inside, downwardly projecting se curing tab, a top, an outside wall, a bottom, and an upwardly projecting securing tab. A vertical member can embrace both the outsider wall of the upwardly facing channel and the outside wall of the sidewardly facing channel. The sidewardly facing channel also can have a downwardly projecting tab. Also, a rail system can have at least two of such rails mounted in relationship to one another so as to accommodate employment of the upwardly and sidewardly facing channels. Further, the rail or the rail system can be mounted to a vehicle cargo bed area to provide a combination.

20 Claims, 1 Drawing Sheet

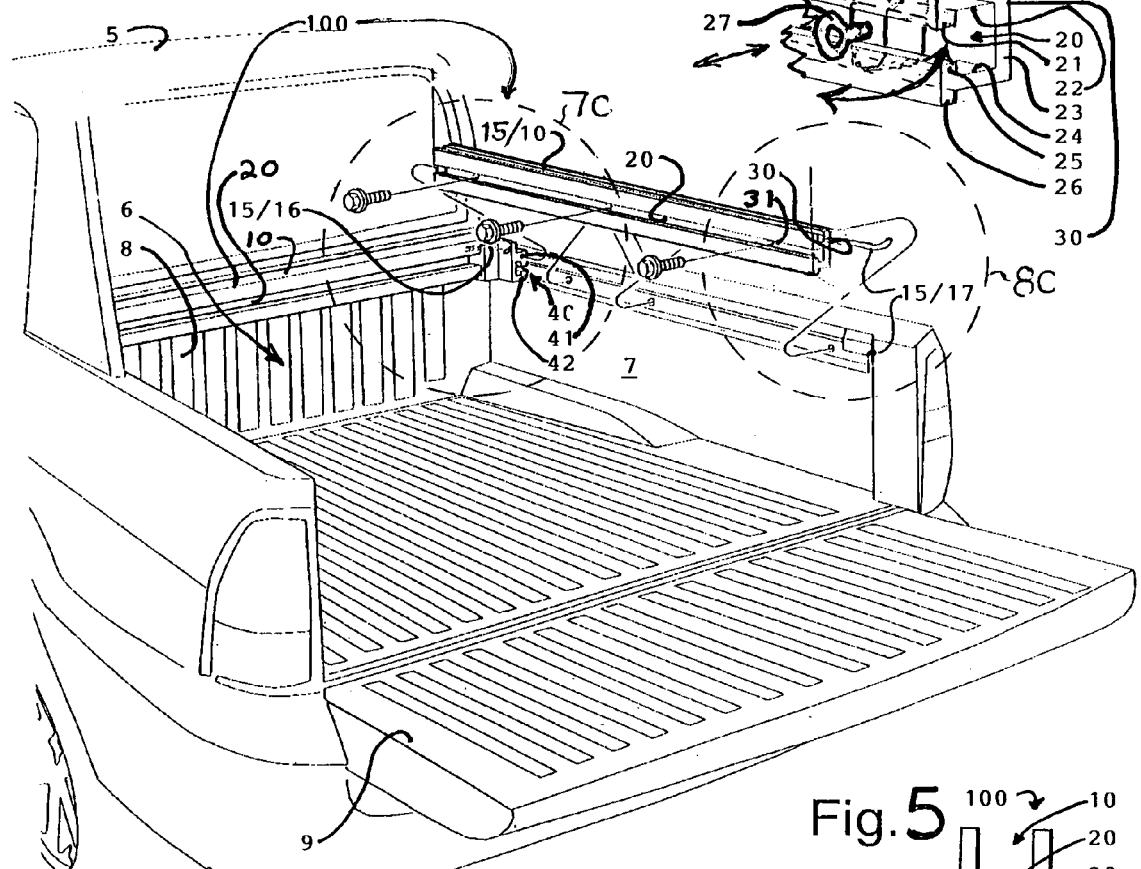
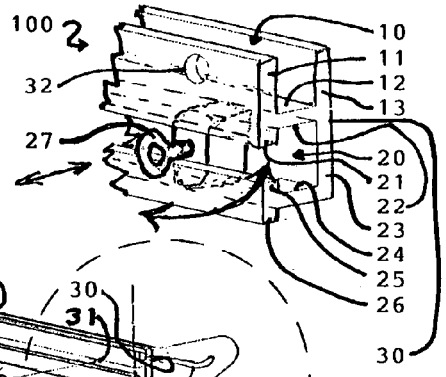
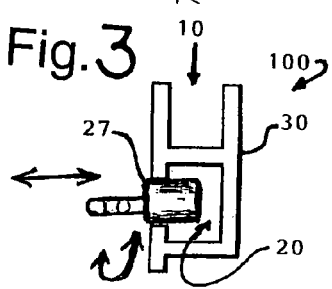
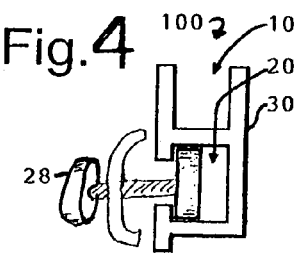
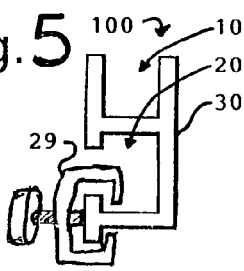
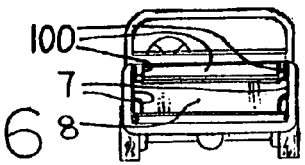
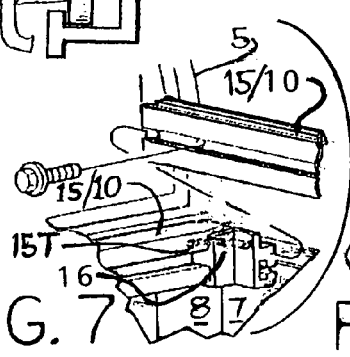
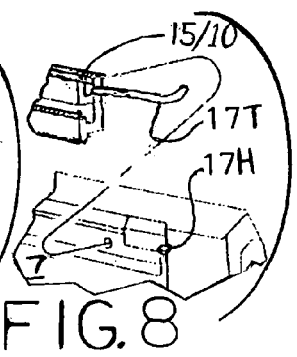

… … …

CARGO AREA RAIL SYSTEM FOR TONNEAU COVER AND/OR ANOTHER ACCESSORY

CROSS-REFERENCE CLAIM OF DOMESTIC PRIORITY

This claims benefits under 35 USC 119(e) of U.S. provisional patent application No. 60/415,956 filed on Oct. 3, 2002 A.D. The complete specification of that application is incorporated herein by reference.

FIELD AND PURVIEW OF THE INVENTION

The present invention concerns a tail and rail system for a vehicle which can accommodate attaching or securing an accessory. For example, the vehicle can be a pickup truck, and the accessory a tonneau cover and/or or another accessory such as a hook, a box for tools, and so forth. The invention as well concerns the rail or rail system in combination with the vehicle and/or accessory.

BACKGROUND TO THE INVENTION

Tonneau covers are among the popular and useful accessories for pickup trucks. They protect and conceal cargo, and increase fuel efficiency by reducing air resistance. Many of those covers are soft tarpaulins or hard material and simply lashed to hooks around the top of the walls of the cargo bed area, and this can make for difficult and sometimes-insecure installation.

Then, too, tool boxes and other accessories extend from side to side across the cargo bed area, say, directly behind the cab, and are permanently mounted to the top of the side walls with bolts. Among other drawbacks, such a tool box, since it extends above the walls of the cargo bed area, makes it difficult if not impossible to mount a tonneau cover.

It would be desirable to improve-upon such art.

FURTHER DISCLOSURE OF THE INVENTION

In general, the present invention provides, in one aspect, a rail comprising an elongate member having an upwardly facing channel and a sidewardly facing channel. In another aspect, a rail system comprises at least two of said rails mounted in relationship to one another so as to accommodate employment of the upwardly and sidewardly facing channels. In a further aspect, said rail or rail system can be mounted to a vehicle cargo bed area to provide a combination whereof.

The invention is useful in vehicular and cargo management.

Significantly, by the invention, tonneau cover installation in pickup trucks is dramatically improved and simplified. The rail system can further hold the tonneau cover securely. Water drainage can be provided as necessary or desired. In addition, other accessories can be positioned on the rail even while the tonneau, cover is installed. Thus provided for can be attachment of a tool box, a gun or game safe, a dog or other animal cage, a hook for tying loose cargo, a tie down, a motorcycle or an ATV lock support, a boat carrier, a ski rack, a pipe or lumber rack, a glass rack, a cargo bed area divider and/or other contrivances that lend themselves useful for transportation in the cargo bed area—depending upon the configuration of the other accessory, whether a separate tonneau cover is in place or hot. Typically, the upwardly facing channel secures the tonneau cover, and the sidewardly facing channel secures the other accessory. The invention is economical to make, and simple to install and use. It provides for a ready and quick locator tool to accurately and securely position the tonneau system and/or other hardware.

Numerous further advantages attend the invention.

With respect to the drawings, which form part of the present specification and which are not necessarily drawn to scale, the following is briefly noted:

FIG. 1 is a perspective view of a rail and rail system of the invention installed in the cargo bed area of a pickup truck.

FIG. 2 is a perspective view of a rail, in detail, with an accessory or accessory anchor secured in place.

FIG. 3 is a rear view of a rail, showing the accessory or accessory anchor inserted into the sidewardly facing channel, ready for securement or removal.

FIG. 4 is a rear view of a rail, showing another accessory or accessory anchor inserted into the sidewardly facing channel.

FIG. 5 is a rear view of a rail, showing another accessory or accessory anchor inserted about the sidewardly facing channel.

FIG. 6 is a rear elevational view of the system of FIG. 1.

FIG. 7 is a perspective view in detail of a portion of the system of FIG. 1, taken from within the circle 7C.

FIG. 8 is a perspective view in detail of a portion of the system of FIG. 1, taken from within the circle 8C.

The invention can be further understood by the following detail, which may be read in view of the drawings. Such is to be taken in an illustrative and not necessarily limiting sense.

More particularly, the rail of the present invention includes both upwardly and sidewardly facing channels. Two or more rails can be mounted in relationship to one another to provide the rail system of the invention, for example, with two rails mounted parallel to each other on opposing sides of a vehicle cargo bed area; with three rails mounted in relationship, with two rails mounted parallel to each other on opposing sides of the vehicle cargo bed, and the third mounted orthogonal to the first two; with four rails, mounted in opposing parallel pairs to form a rectangle or square; and so forth. Beneficially, the upwardly facing channels face upward when mounted, and the sidewardly facing channels face sideward and open toward each other when mounted. The rail or rail system can be mounted in combination with a vehicle and its cargo bed area. The vehicle may be a pickup truck, van, trailer, and so forth and the like.

The rail may be made of any suitable material, to include metal, plastic and/or wood. Each rail can be made in separate components and assembled, or, preferably, made to be of one piece and of the same material throughout. For example, each rail can be made in one unitary piece of extruded aluminum.

With respect to the drawings, rail 100 can be mounted to pickup truck 5 in its cargo bed area 6 on side walls 7; front wall 8; and/or tailgate inside wall 9. Note, FIGS. 1 and 6. The rail 100 includes upwardly facing channel 10 and sidewardly facing channel 20, connected through vertical member 30, and in the configuration depicted may be considered to be a "y-rail."

The upwardly facing channel 10 can be defined by inside wall 11, bottom 12, and outside wall 13. The wall 13 can be part of the vertical member 30. The channel 10 is configured to hold many if not nearly all types of tonneau cover systems, especially of the hard shell variety. The channel 10 thus may be considered to have a U-shape. The U-shape construction of the channel 10 provides a load-bearing surface to fasten the tonneau cover. Hardware, for instance, in the form of latches, pins, strikers, locks, receivers, hinges, and other mechanical fasteners, as well as magnetic and other fasteners, can be fastened or fabricated in or onto the channel 10 to provide for tonneau operations. The U-shape of the channel 10 also provides a water-management trough for directing water shed by the tonneau cover or vehicle. The channel 10 can be provided with water guidance subsystem 15, for instance, the channel 10 and connector 16, say, with elastomeric insert tube 15T, connecting the channels 10 of separate rails 100 mounted in the same pickup truck 5; and/or water exit subsystem 17, for instance, tubing 17T through orifice 17H, directing the water outside the cargo bed area 6 of the pickup truck 5. Note, FIGS. 7 and 8.

The sidewardly facing channel 20 can be defined by inside, downwardly projecting securing tab 21; top 22; outside wall 23, which can be part of the vertical member 30; bottom 24; and upwardly projecting securing tab 25. Downwardly projecting tab 26 may also be provided for additional securing capability. The sidewardly facing channel 20 thus may be considered to have a C- or G-shape, with the lower member even considered to have a T-shape. The shape of the channel 20 can provide for ready attachment and/or removal of the tool box, gun or game safe, dog or other animal cage, hook for tying loose cargo, tie down, motorcycle or ATV lock support, boat carrier, ski rack, pipe or lumber rack, glass rack, cargo bed area divider. Suitable fastening contrivances, for instance, twist tab 27 (FIGS. 2 & 3); button-end screw clamp 28 (FIG. 4); C-frame screw clamp 29 (FIG. 5), may be used with the channel 20 for the purpose. A simple hanging hook, or a button or eye, may be used.

The vertical member 30 may be provided with holes 31 for mounting the rail 30 to the walls 7, 8, 9. Additional hole(s) 32 may also be provided for mounting stop blocks, for insertion of a securing peg, a bolt and nut accessory or accessory anchor, to include with a standard head, an eye, or a hook, and so forth.

Mounting of the rail 100 can be accomplished in any suitable manner. For instance, welding, gluing, screwing, riveting, or clamping may be employed to mount the rail 100 to the wall of the cargo bed area 6 of the pickup truck 5 or other vehicle. Two or more rails 100 can be connected by abutting them directly without the aid of a connector, in which case simple butting or mitering of ends of each rail 100 may be employed, or with the aid of a connector, for example, corner connector 40 with corresponding male members 41, 42 about which parts of the channel 20 are slid.

The present invention is thus provided. Various features, parts, subcombinations and combinations may be employed with or without reference to other features, parts, subcombinations or combinations in the practice of the invention, and numerous follows:

The invention claimed is:

1. A rail comprising an elongate member having an upwardly facing channel defined by an inside wall, a bottom, and an outside wall, with the inside and outside walls of substantially the same height such that the upwardly facing channel has a U-shape; and a sidewardly facing channel defined by an inside, downwardly projecting securing tab, a top, an outside wall, a bottom, and an upwardly projecting securing tab such that the sidewardly facing channel has a C- or G-shape; wherein a vertical member embraces both the outside wall of the upwardly facing channel and outside wall of the sidewardly facing channel, and the upwardly facing channel and the sidewardly facing channel are on the same side of the vertical member.

2. The rail of claim 1, wherein the upwardly facing channel is positioned directly above the sidewardly facing channel.

3. The rail of claim 2, wherein the sidewardly facing channel also has a downwardly projecting tab.

4. The rail of claim 1, wherein at least one of the following features is present:
   the upwardly facing channel is provided with a water guidance subsystem;
   the vertical member is provided with holes.

5. In combination, the rail of claim 1, which is mounted to a wall of a vehicle cargo bed area.

6. In combination, the rail of claim 2, which is mounted to a wall of a vehicle cargo bad area.

7. In combination, the rail of claim 3, which is mounted to a wall of a vehicle cargo bed area.

8. In combination, the rail of claim 4, which is mounted to a wall of a vehicle cargo bed area.

9. A rail system comprising at least two rails; each including an elongate member having an upwardly facing channel defined by an inside wall, a bottom, and an outside wall, with the inside and outside walls of substantially the same height such that the upwardly facing channel has a U-shape; and a sidewardly facing channel defined by an inside, downwardly projecting scouting tab, a top, an outside wall, a bottom, and an upwardly projecting securing tab such that the sidewardly facing channel has a C- or G-shape; wherein a vertical member embraces both the outside wall of the upwardly facing channel and outside wall of the sidewardly facing channel, and the upwardly facing channel and the sidewardly facing channel are on the same side of the vertical member—with the at least two rails mounted in relationship to one another so as to accommodate employment of the upwardly and sidewardly facing channels.

10. The rail system of claim 9, wherein each upwardly facing channel is mounted to face upwards; and each sidewardly facing channel is mounted to generally face each other sidewardly facing channel of the at least two rails by having the at least two rails mounted in a substantially orthogonal and/or substantially parallel relationship.

11. The rail system of claim 10, wherein the upwardly facing channel is positioned directly above the sidewardly facing channel of each of the at least two rails.

12. The rail system of claim 11, wherein each sidewardly facing channel also has a downwardly projecting tab.

13. In combination, the rail system of claim 9, which is mounted to walls of a vehicle cargo bed area.

14. In combination, the rail system of claim 10, which is mounted to walls of a vehicle cargo bed area.

15. In combination, the rail system of claim 11, which is mounted to walls of a vehicle cargo bed area.

16. In combination, the rail system of claim 12, which is mounted to walls of a vehicle cargo bed area.

17. The combination of claim 14, wherein two of the at least two rails are connected in the substantially orthogonal relationship by a corner connector having male members about which parts of the sidewardly facing channel are slid.

18. A rail comprising an elongate member having:
   a first rail channel that is an upwardly facing channel, which is defined by an inside wall, a bottom, and an outside wall, with the inside and outside walls of substantially the same height such that upwardly facing channel has a U-shape, and which is provided with the following:
      a water guidance subsystem; and a water exit subsystem, which includes tubing that can be employed to direct water outside a vehicle cargo bed area on a wall of which the rail can be mounted; and a second rail channel that is a sidewardly facing channel, which is defined by an inside, downwardly projecting securing tab, a top, an outside wall, a bottom, and an upwardly projecting securing tab such that the sidewardly facing channel has a C- or G-shape;

wherein a vertical member embraces both the outside wall of the upwardly facing channel and outside wall of the sidewardly facing channel, and the upwardly facing channel and the sidewardly facing channel are on the same side of the vertical member.

19. The rail of claim 18, wherein the water guidance subsystem includes a connector insert that can connect the upwardly facing channel of the rail with another upwardly facing channel of a second rail embracing a second elongate member having the other upwardly facing channel.

20. In combination, the rail and second rail of claim 19, which are mounted to walls of the vehicle cargo bed area.

* * * * *